(12) United States Patent
Graham et al.

(10) Patent No.: US 10,202,661 B2
(45) Date of Patent: Feb. 12, 2019

(54) RECOVERING CHROME FROM A TANNERY PROCESS

(71) Applicant: Tyson Foods, Inc., Springdale, AR (US)

(72) Inventors: Dale F. Graham, Dakota Dunes, SD (US); Gary Rennerfeldt, Dakota Dunes, SD (US); Pansouvanh Douangdara, Sioux City, IA (US); John Lawrence Quinlain, Sioux City, IA (US)

(73) Assignee: Tyson Foods, Inc., Springdale, AR (US)

( * ) Notice: Subject to any disclaimer, the term of this patent is extended or adjusted under 35 U.S.C. 154(b) by 196 days.

(21) Appl. No.: 15/436,023

(22) Filed: Feb. 17, 2017

(65) Prior Publication Data

US 2017/0158530 A1 Jun. 8, 2017

Related U.S. Application Data

(62) Division of application No. 14/109,509, filed on Dec. 17, 2013, now Pat. No. 9,683,270.

(51) Int. Cl.

| | | |
|---|---|---|
| *C02F 1/38* | (2006.01) |
| *B01D 17/02* | (2006.01) |
| *C02F 1/40* | (2006.01) |
| *C22B 34/32* | (2006.01) |
| *C22B 7/00* | (2006.01) |
| *C14C 3/32* | (2006.01) |
| *C14C 3/06* | (2006.01) |
| *C02F 9/00* | (2006.01) |
| *C02F 101/22* | (2006.01) |
| *C02F 1/02* | (2006.01) |
| *C02F 1/66* | (2006.01) |

(Continued)

(52) U.S. Cl.
CPC ............ *C14C 3/32* (2013.01); *B01D 17/0208* (2013.01); *B01D 17/0217* (2013.01); *C02F 1/385* (2013.01); *C02F 1/40* (2013.01); *C02F 9/00* (2013.01); *C14C 3/06* (2013.01); *C22B 7/006* (2013.01); *C22B 34/32* (2013.01); *C02F 1/02* (2013.01); *C02F 1/66* (2013.01); *C02F 2001/007* (2013.01); *C02F 2101/22* (2013.01); *C02F 2103/24* (2013.01)

(58) Field of Classification Search
None
See application file for complete search history.

(56) References Cited

U.S. PATENT DOCUMENTS

| | | | | |
|---|---|---|---|---|
| 4,100,154 A | * | 7/1978 | Holloway | ................ A23J 1/10 530/355 |
| 4,260,491 A | * | 4/1981 | Cassidy | ................ C02F 1/683 210/720 |

(Continued)

*Primary Examiner* — Krishnan S Menon
*Assistant Examiner* — Ryan B Huang
(74) *Attorney, Agent, or Firm* — Mark E. Stallion; Greensfelder Hemker & Gale PC

(57) ABSTRACT

A system and method for a chromium recovery process for recovering chromium from byproducts resulting from a tannery process. A system and process for solubilizing chromium contained in the oil byproduct into the remaining water content within the oil and extracting the water from the oil with the chromium sufficiently solubilized in the water such that the chromium content in the oil is sufficiently reduced below hazardous levels.

11 Claims, 1 Drawing Sheet

(51) Int. Cl.
*C02F 103/24* (2006.01)
*C02F 1/00* (2006.01)

(56) References Cited

U.S. PATENT DOCUMENTS

| | | |
|---|---|---|
| 5,271,912 A | 12/1993 | Taylor et al. |
| 6,177,014 B1 | 1/2001 | Potter et al. |
| 6,352,714 B1 | 3/2002 | Erickson et al. |
| 2004/0030102 A1* | 2/2004 | Artoni ............... C09H 1/04 530/354 |

* cited by examiner

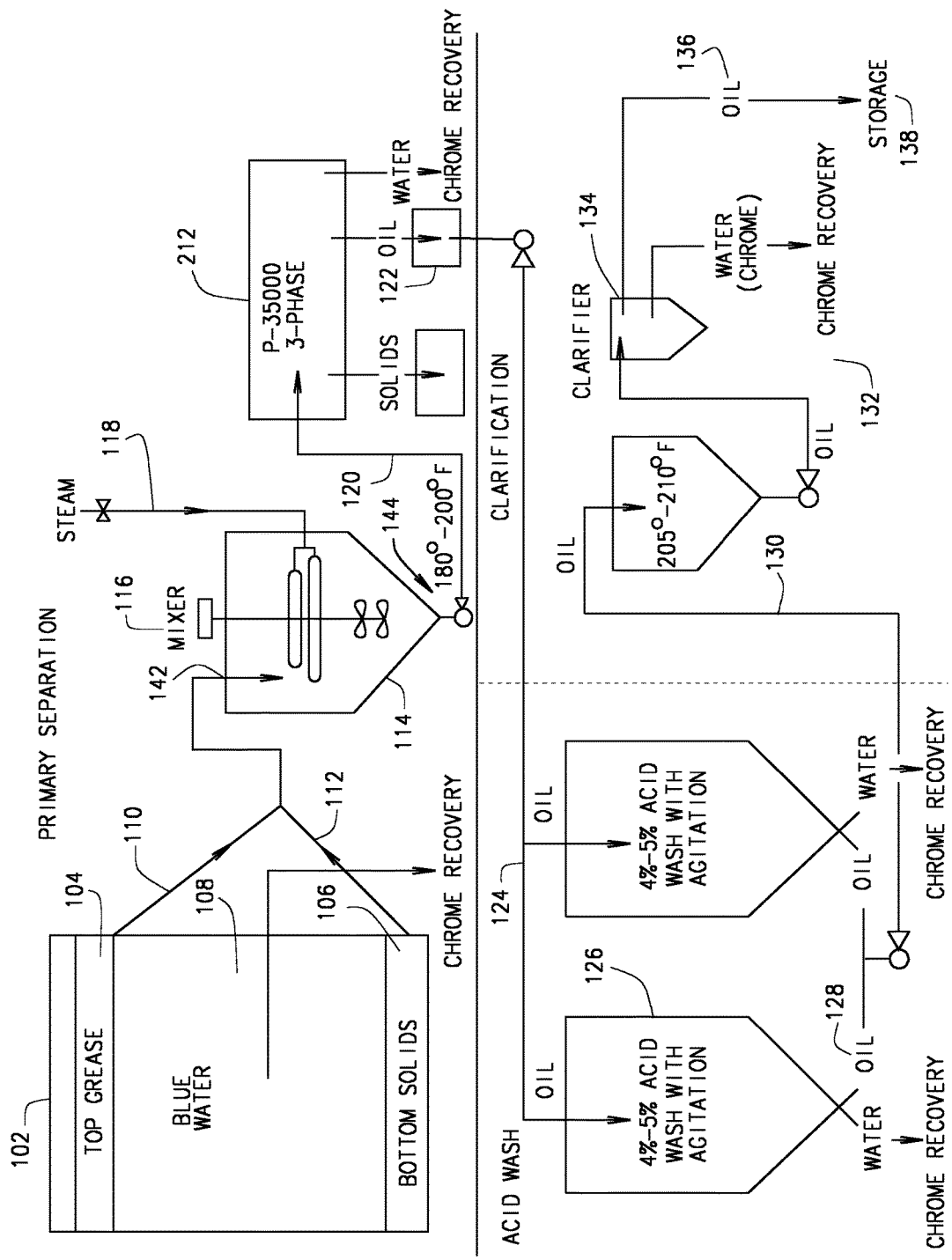

RECOVERING CHROME FROM A TANNERY PROCESS

CROSS REFERENCE TO RELATED APPLICATIONS

This application is a divisional of and claims the benefit of and priority to co-pending U.S. application Ser. No. 14/109,509, filed Dec. 17, 2013, which is incorporated herein by reference in its entirety.

BACKGROUND

Field

This technology relates generally to the tanning process and, more particularly, to recovery of chrome from a tannery process.

Background Art

Tanning, sometimes referred to as "tannery process", is the process of treating the skin of an animal to produce leather, which is more durable and less susceptible to decomposition, and which is conducive for use in clothing or furnishing product or other covering items. Traditionally, tanning used tannin, an acidic chemical compound found in oak and fir trees from which the tanning process draws its name. A tannery is the term for a place where the skins are processed, hence, the reason for why the process is also referred to "tannery process".

Tanning leather is a process which permanently alters the protein structure of skin. Making "rawhide" (untanned but worked hide) does not require the use of tannin. Rawhide is made by removing the flesh and fat and then the hair by use of an aqueous solution (this process is often called "liming" when using lime and water or "bucking" when using wood ash (lye) and water), then scraping over a beam with a somewhat dull blade, then drying. These methods for removing the hair can also act to clean the skin prior the tanning process to allow for penetration and action of the tanning agent, so that all the steps in preparation of rawhide except drying are often precursors to the more complex process of tanning and production of leather.

Tanning can be performed with either vegetable or mineral methods. Before tanning, the skins have the hair removed as discussed above, degreased, desalted and soaked in water over a period that can last up to about approximately 2 days. To prevent damage of the skin by bacterial growth during the soaking period, biocides can be utilized. Fungicides can also be used in the process to protect wet leathers from mold growth.

An animal can be killed and skinned before the body heat leaves the tissues and the skin can be sent on to the tannery. This can be done by the tanner, or by obtaining a skin from a rendering facility or a farm where the animals are grown. Preparing hides begins by curing them with salt. Curing is employed to prevent putrefaction of the protein substance (collagen) from bacterial growth during the time lag that might occur from procuring the hide to when it is processed. Curing removes excess water from the hides and skins using a difference in osmotic pressure. The moisture content of hides and skins gets greatly reduced. In wet-salting, the hides are heavily salted, then pressed into packs for about 30 days. In brine-curing the hides are agitated in a salt water bath for about 16 hours. The steps in the production of leather between curing and tanning are collectively referred to as beamhouse operations. They include, in order, soaking, liming, removal of extraneous tissues (unhairing scudding, and fleshing), deliming, bating, drenching, and pickling.

The Chromium(III) sulfate ($[Cr(H_2O)_6]_2(SO_4)_3$) type tannery process is regarded as an efficient and effective tanning process. Chromium(III) compounds of the sort used in tanning are significantly less toxic than hexavalent chromium. Chromium(III) sulfate dissolves to give the hexaaquachromium(III) cation, $[Cr(H_2O)_6]^{3+}$, which at higher pH undergoes processes called oblation to give polychromium(III) compounds that are active in tanning-being the cross-linking of the collagen subunits. The chemistry of $[Cr(H_2O)_6]^{3+}$ is more complex in the tanning bath rather than in water due to the presence of a variety of ligands. Some ligands include the sulfate anion, the collagen's carboxyl groups, amine groups from the side chains of the amino acids, as well as "masking agents." Masking agents are carboxylic acids, such as acetic acid, used to suppress formation of polychromium(III) chains. Masking agents allow the tanner to further increase the pH to increase collagen's reactivity without inhibiting the penetration of the chromium(III) complexes.

Collagen is characterized by a high content of glycine, proline, and hydroxprolene, usually in the repeat -gly-pro-hypro-gly. These residues give rise to collagen's helical structure. Collagen's high content of hydroxyproline allows for significant cross-linking by hydrogen bonding within the helical structure. Ionized carboxyl groups ($RCO_2^-$) are formed by hydrolysis of the collagen by the action of hydroxide. This conversion occurs during the liming process, before introduction of the tanning agent (chromium salts). The ionized carboxyl groups coordinate as ligands to the chromium(III) centers of the oxo-hydroxide clusters. Tanning increases the spacing between protein chains in collagen from 10 to 17 Å. The difference is consistent with cross-linking by polychromium species, of the sort arising from olation and oxolation.

Subsequent to application of the chromium agent, the bath is treated with sodium bicarbonate to increase the pH to 4.0-4.3. This increase induces cross-linking between the chromium and the collagen. The pH increase is normally accompanied by a gradual temperature increase up to 40° C. Chromium's ability to form such stable bridged bonds explains why it is considered one of the most efficient tanning compounds. Chromium-tanned leather can contain between 4 and 5% of chromium. This efficiency is characterized by its increased hydrothermal stability of the skin, and its resistance to shrinkage in heated water.

However, one down side to the chromium tanning process is the by products that are produced that have to be safely disposed of. Byproducts of the tanning process include some small solids, water and oil. Each of these by products can contain residual chromium that is at sufficiently high levels that it requires special hazardous waste disposal in order to safely dispose of the byproduct. The lack of the ability to safely extract and dispose of larger amounts of water and the lack of the ability to recover the chromium from larger amounts of the water in order to reuse the chromium and easily dispose of the water without hazardous waste handling measures creates a burden and cost for the tannery process. The result of the lack of ability to recover larger amounts of water from the oil byproduct is the inability to recover chromium from the oil byproduct such that the chromium lever is sufficient low to safely reuse the oil, which means that the oil has to be disposed of under certain hazardous waste standards, which can be costly.

BRIEF SUMMARY

The invention is a chromium recovery process for recovering chromium from byproducts resulting from a tannery process. The waste byproducts from a tannery process can typically be stored in large storage drums or tanks for a period of time, which results in a three phase byproduct that includes small solids which settle to the bottom of the tank and an oil byproduct that rises to the top of the tank and water is suspended there between. The three phase separation is simply the result of gravity and the varying density of the different phases of the byproduct. All three phases of the byproduct can contain residual amounts of chromium at levels that require special hazardous waste disposal. The invention includes a process for solubilizing chromium contained in the oil byproduct into the remaining water content within the oil and extracting the water from the oil with the chromium sufficiently solubilized in the water such that the chromium content in the oil is sufficiently reduced below hazardous levels. The invention is a system and process for recovering chromium that allows greater portions of the chromium separated from the oil to be reused in a tanning process because it allows more water and soluble chrome to be removed from the oil and therefore a greater amount of water can be processed to have sufficiently low chromium levels to be readily disposed of as waste water and allows the oil to have chromium levels less than five (5) parts per million such that the oil can be recycled for reuse such as for biodiesel.

The system includes large storage tanks or drums for holding the byproduct from the chrome tannery process. The tanks are used to store the product until separation occurs where the byproduct separates into three phases based on varying density and gravity. Solids settle to the bottom of the tank and oil rises to the top and blue water (water containing chromium) is suspended there between. This three phase separation process can take from about approximately 10 to 12 hours. A skimmer is used to skim the oil from the top portion of the three phase byproduct. Decanting can also be utilized. The water is decanted off or pumped/poured off and the solids are pumped off. The oil and the solids are fed to a tank with a mechanical stirrer and steam sparge (a steam sparge mixer) that provides low viscosity turbulent flow mixing and the mixture is heated from ambient temperature to about 180 degrees to about 200 degrees Fahrenheit. The steam sparged process can last for about approximately six (6) hours.

The steam sparged mixture is pumped into a three phase centrifuge, which separates the solids, oil and water in one step. Therefore, additional water is removed from the oil and solids that can be processed for removing chrome. The water reduced solids are appropriately disposed of The oil is feed into an agitator where the oil is agitated and a 4% -5% acid wash is performed. The agitation is provided for adequate mixing and to assist in the reaction of the chrome and the acid where the chrome is solubilized in the water still within the oil. When the agitation stops, the oil and water will separate. The water can be decanted off and the oil can be heated from about 180 degrees to about 205 degrees to about 210 degrees Fahrenheit and feed into a clarifier or a vertical disc type centrifuge where water remaining in oil is removed. The acid wash and heating can last for approximately two (2) hours.

The oil should now have sufficiently low chromium such that it can be reused. The water throughout the process that is drained off can be precipitated to remove the chrome and the chrome can be reused for tanning and the water can be disposed of as normal non-hazardous waste water.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 1 is a functional diagram of the system and process.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIG. 1 and like reference numerals are being used consistently throughout to refer to like and corresponding parts of the invention for all of the various views and figures of the drawing. Also, please note that the first digit(s) of the reference number for a given item or part of the invention should correspond to the FIGURE number in which the item or part is first identified.

One embodiment of the present technology comprising a three phase decanter, an acid wash agitator and a clarifier teaches a novel apparatus and method for recovering chrome from oil byproduct of a tannery process.

The details of the invention and various embodiments can be better understood by referring to the figures of the drawing. Referring to FIG. 1, a system and process is illustrated for recovering chrome from oil byproduct. The byproduct from the chrome tannery process is stored in a large settling tank as illustrated by 102. The byproduct is allowed to form a three phase system due to gravity and the varying density of the three different phases. The oil byproduct 104 phase will rise to the top of the three phase byproduct. The solid byproduct 106 phase will settle to the bottom and the water byproduct 108 phase will be suspended between the oil byproduct phase and the solid byproduct phase. The oil byproduct is skimmed from the top and pumped 110 into a steam sparging mixer. The oil byproduct that is skimmed from the settling tank can typically have greater than 10,000 parts-per-million (ppm) Chromium. The water is decanted off and the solid byproduct is pumped 112 into the steam sparging mixer 114. The steam sparging mixer has a mixing element 116 for mixing the byproducts and a steam infuser 118 for providing turbulent flow mixing. The steam sparge raises the temperature from ambient to about 180 degrees to about 200 degrees Fahrenheit.

The system provides steam sparging and mixing of the oil and solid byproducts from a chrome tannery process forming a steam sparged mixture. The steam sparged mixture is steam infused, heated and pumped 120 into a three phase centrifuge 121 for separating out a separated oil 122 byproduct. The chrome content of the oil byproduct after the 3-phase separation can be about approximately less than 15,000 ppm. The separated oil byproduct is pumped 124 to an acid wash agitator vessel 126 having an agitator and an acid dispensing mechanism. The three phase separated oil 122 byproduct is acid washed and agitated. The agitation can be ceased which allows an acid washed oil 128 byproduct to separate. The acid washed oil can have about approximately less than 50 ppm. The acid washed oil 128 can be pumped 130 to a heating vessel and clarifier system 132. The step of heating the acid washed oil byproduct and removing water from the acid washed oil byproduct can be performed using a clarifier 134 forming a clarified oil 136 byproduct. The clarified oil can be captured for reuse 138. The clarified oil can have a chrome content of about approximately less than 1 ppm.

When heating the steam sparged mixture it can be heated from about approximately ambient to 180 degrees to about approximately 200 degrees Fahrenheit. The process of acid washing is about four (4) percent to about five (5) percent acid washing. The process of heating the acid washed oil byproduct can be heating from about 170 degrees to 190 degrees Fahrenheit to about 205 degrees to about 210 degrees Fahrenheit. When clarifying the acid washed oil byproduct the clarifier can be a disc type vertical centrifuge. The captured clarified oil byproduct can have less than five (5) parts per million chromium.

The steam sparging mixer can have a steam sparger input port 142 communicably connected to a tannery process byproduct settling tank 102 and operable to receive oil byproduct and solids byproduct from the tannery process byproduct settling tank into the steam sparging mixer, and said steam sparging mixer can have a steam sparger for mixing and heating the oil byproduct and the solid byproduct and the steam sparging mixer can have an output pump 144 communicably connected and adapted to pump a mixed steam sparged byproduct into a three (3) phase centrifuge.

The acid wash agitation vessel can have an agitator and an acid infuser and having an agitation vessel input port communicably connected to an oil output of the three (3) phase and operable to receive the oil byproduct into the agitation vessel and said acid wash the agitation vessel can have an output pump and can be communicably connected for flowing acid washed oil to a heater and clarifier. Heating the steam sparging mixture with the steam sparger and mixer can be adapted to heat contents from less than or equal to 180 degrees Fahrenheit to about 180 degrees to about 200 degrees Fahrenheit. The acid washing agitator vessel can adapted to provide about four (4) percent to about five (5) percent acid washing. When heating the acid washed oil byproduct it can be heated from about 205 degrees to about 210 degrees Fahrenheit. The clarifier can be a disc type vertical centrifuge.

A testing an analysis was performed utilizing the Chrome Recovery process as outlined herein and the following illustrates the results.

Backgound:

The Raw Grease collected by the DC Hides/Tannery (which consists of Top Grease, Bottom Solids, and Blue Water) collected, mixed, heated to 180°-200° F., and then pump through our P-35000 3-Phase centrifuge. The 3-Phase will separate the solids, water, and oil. The solids will be collected and properly dispose of, or provided for further processing. The water will go back down the drain to the Chrome Recovery process. The oil will be collected and sent back to the mixing tank. A sample of this oil will be collected and analyzed for Chrome, moisture, and FFA.

The oil that is collected will then be acid washed with a 4%-5% Sulfuric Acid solution. The 4%-5% Sulfuric Acid solution will be added to the oil in equal volume, agitated, and then gravity separated. A sample of the oil will be collected and analyzed for Chrome, Moisture, and FFA. The same sample will then be centrifuged The sample will then be centrifuged in a table top clinical centrifuge to separate any existing water. The oil will then be siphoned or decanted off the top and analyzed for Chrome, Moisture, and FFA. This acid wash step and sample analysis will be performed three separate times to determine the effectiveness of each acid wash.

This process will then be repeated using Phosphoric Acid for the wash step in place of Sulfuric Acid.

Procedure Update:

A 4th acid wash was performed and the mixture was allowed to settle overnight before separation.

ANALYSIS - SULFURIC ACID WASH
DATE: Nov. 20, 2013

| | SAMPLE ANALYSIS | | |
|---|---|---|---|
| SAMPLE I.D. | CHROME (ppm) | MOISTURE (%) | FFA (%) |
| RAW GREASE | No Sample | No Sample | No Sample |
| 3-PHASE GREASE | 7,641.82 | 15.12% | 18% |
| ACID WASH #1 - RAW | 2,969.34 | 14.83% | 34% |
| ACID WASH #1 - CENTRIFUGED | 2,237.76 | 3.45% | 28% |
| ACID WASH #2 - RAW | 2,647.01 | 15.99% | 34% |
| ACID WASH #2 - CENTRIFUGED | 1,489.41 | 2.94% | 29% |
| ACID WASH #3 - RAW | 1,607.04 | 16.46% | 33% |
| ACID WASH #3 - CENTRIFUGED | 1,541.25 | 4.06% | 29% |
| ACID WASH #4 - RAW | 1,314.54 | 5.62% | 30% |
| ACID WASH #4 - CENTRIFUGED | 1,274.20 | 3.67% | 29% |

ANALYSIS - PHOSPHORIC ACID WASH
DATE: Dec. 9, 2013

| | SAMPLE ANALYSIS | | |
|---|---|---|---|
| SAMPLE I.D. | CHROME (ppm) | MOISTURE (%) | FFA (%) |
| RAW GREASE | No Sample | No Sample | No Sample |
| 3-PHASE GREASE | 13,260.51 | 6.02 | 20.00 |
| ACID WASH #1 - RAW | 340.28 | 8.22 | 34.00 |
| ACID WASH #1 - CENTRIFUGED | 47.79 | 3.77 | 33.00 |
| ACID WASH #2 - RAW | 37.78 | 5.65 | 33.00 |
| ACID WASH #2 - CENTRIFUGED | 47.46 | 3.40 | 32.00 |
| ACID WASH #3 - RAW | 54.44 | 4.74 | 33.00 |
| ACID WASH #3 - CENTRIFUGED | 47.02 | 5.07 | 33.00 |

Conclusion: The test results confirmed that the following parameters can be achieved:

A representative summary:

Settling Tank Stage: >10,000 ppm Chromium

Chrome content after 3-Phase: <15,000 ppm

Chrome content after acid wash: <50 ppm

Chrome content after clarifier: <1 ppm (Estimation)

Further refinements to the process can be made without departing from the scope of the invention as claimed herein. The clarifier process step can be further refined to achieve less than 1 ppm.

The various chrome recovery examples shown above illustrate a chrome recovery system and process. A user of the present technology may choose any of the above implementations, or an equivalent thereof, depending upon the desired application. In this regard, it is recognized that various forms of the subject chrome recovery system and process could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention. Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

Other aspects, objects and advantages of the present invention can be obtained from a study of the drawings, the disclosure and the appended claims.

What is claimed is:

1. A chrome recovery system comprising:
a steam sparging mixer having a steam sparger input port communicably connected to a tannery process byproduct settling tank to receive oil byproduct and solids byproduct from the tannery process byproduct settling tank into the steam sparging mixer, and said steam sparging mixer having a mixer and steam sparger for mixing and heating the oil byproduct and the solid byproduct and having a steam sparger output pump communicably connected to and adapted to pump a mixed steam sparged byproduct into a three (3) phase centrifuge configured to separate a centrifuged oil byproduct; and
an acid wash agitation vessel having an agitator and an acid infuser configured to infuse acid for chrome solubilizing and having an agitation vessel input port communicably connected to an oil output of the three (3) phase centrifuge and operable to receive the centrifuged oil byproduct into the acid wash agitation vessel and said acid wash agitation vessel having an acid wash output pump communicably connected to a heater and clarifier system for pumping acid washed oil into the heater and clarifier system, where the heater and clarifier system has a clarifier oil output adapted for outputting the clarified oil byproduct.

2. The system as recited in claim 1, where the tannery process byproduct settling tank includes a skimmer configured to skim the oil byproduct from a top portion of a three phase byproduct.

3. The system as recited in claim 1, where the tannery process byproduct settling tank includes a settling tank decanter configured to decant the chrome water from the tannery process byproduct settling tank.

4. The system as recited in claim 1, where the steam sparging mixer includes a mechanical stirrer that provides low viscosity turbulent flow mixing.

5. The system as recited in claim 1, where the steam sparger is configured to heat the mixed steam sparged byproduct from ambient to about 180 degrees to about 200 degrees Fahrenheit.

6. The system as recited in claim 1, where the three (3) phase centrifuge is configured to effect separation of the mixed steam sparged byproduct into three phases including the centrifuged oil byproduct phase, a centrifuged solid phase and a centrifuged chrome water phase.

7. The system as recited in claim 1, where the acid infuser of the acid washing agitatation vessel is adapted to provide for about four (4) percent to about five (5) percent acid washing.

8. The system as recited in claim 1, where the heater and clarifier system is configure to heat the acid washed oil byproduct to about 205 degrees to about 210 degrees Fahrenheit.

9. The system as recited in claim 1, where the clarifier of the heater and clarifier system is a disc type vertical centrifuge clarifier.

10. The system as recited in claim 1, where the clarifier is adapted to capture clarified oil byproduct that has less than five (5) parts per million chromium.

11. The system as recited in claim 1, where one or more of the tannery process byproduct settling tank, the steam sparging mixer, the three (3) phase centrifuge, the acid wash agitation vessel and the heater and clarifier system include a chrome water recovery port configured to channel chrome water to a precipitator configured to precipitate the chrome water to recover the chrome.

* * * * *